US011942691B2

(12) United States Patent
Yoshikawa et al.

(10) Patent No.: US 11,942,691 B2
(45) Date of Patent: Mar. 26, 2024

(54) ANTENNA, ARRAY ANTENNA, WIRELESS COMMUNICATION MODULE, AND WIRELESS COMMUNICATION DEVICE

(71) Applicant: KYOCERA CORPORATION, Kyoto (JP)

(72) Inventors: Hiromichi Yoshikawa, Yokohama (JP); Nobuki Hiramatsu, Yokohama (JP); Masamichi Yonehara, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 310 days.

(21) Appl. No.: 17/290,774

(22) PCT Filed: Oct. 29, 2019

(86) PCT No.: PCT/JP2019/042425
§ 371 (c)(1),
(2) Date: May 3, 2021

(87) PCT Pub. No.: WO2020/090837
PCT Pub. Date: May 7, 2020

(65) Prior Publication Data

US 2021/0384644 A1 Dec. 9, 2021

(30) Foreign Application Priority Data

Nov. 2, 2018 (JP) ................................ 2018-207478

(51) Int. Cl.
*H01Q 21/08* (2006.01)
*H01Q 9/04* (2006.01)

(52) U.S. Cl.
CPC ............ *H01Q 21/08* (2013.01); *H01Q 9/045* (2013.01)

(58) Field of Classification Search
CPC ........ H01Q 21/08; H01Q 9/045; H01Q 1/525; H01Q 9/0478; H01Q 21/065; H01Q 21/24
See application file for complete search history.

(56) References Cited

U.S. PATENT DOCUMENTS

2008/0204332 A1* 8/2008 Ikeura .................. H01Q 1/3241 343/703
2010/0283705 A1 11/2010 Achour et al.
(Continued)

FOREIGN PATENT DOCUMENTS

JP 2003224416 A * 8/2003
JP 2008301364 A 12/2008
(Continued)

*Primary Examiner* — Dieu Hien T Duong
(74) *Attorney, Agent, or Firm* — HAUPTMAN HAM, LLP

(57) ABSTRACT

The present disclosure provides a novel antenna. An antenna according to an example of a plurality of embodiments of the present disclosure includes a radiation conductor, a ground conductor, a first feeding line, a second feeding line, and a connecting conductor. The first feeding line is electromagnetically connected to the radiation conductor and configured to excite the radiation conductor in a first direction. The second feeding line is electromagnetically connected to the radiation conductor and configured to excite the radiation conductor in a second direction. The connecting conductor is positioned apart from the center of the radiation conductor. The connecting conductor is spaced apart from the first feeding line by a first distance. The connecting conductor is spaced apart from the second feeding line by a second distance. The first distance is substantially equal to the second distance.

15 Claims, 4 Drawing Sheets

(56) References Cited

U.S. PATENT DOCUMENTS

| | | | | |
|---|---|---|---|---|
| 2014/0292595 | A1 | 10/2014 | Kim et al. | |
| 2015/0214633 | A1* | 7/2015 | Pan | H01Q 21/067 343/893 |

FOREIGN PATENT DOCUMENTS

| | | | |
|---|---|---|---|
| JP | 2016115990 | A | 6/2016 |
| JP | 2016139965 | A | 8/2016 |

* cited by examiner

ANTENNA, ARRAY ANTENNA, WIRELESS COMMUNICATION MODULE, AND WIRELESS COMMUNICATION DEVICE

CROSS REFERENCE TO RELATED APPLICATIONS

This application is a National Stage of PCT international application Ser. No. PCT/JP2019/042425 filed on Oct. 29, 2019 which designates the United States, incorporated herein by reference, and which is based upon and claims the benefit of priority from Japanese Patent Application No. 2018-207478 filed on Nov. 2, 2018, the entire contents of which are incorporated herein by reference.

FIELD

The present disclosure relates to an antenna, an array antenna, a wireless communication module, and a wireless communication device.

BACKGROUND

In a method of changing a radiation pattern of an antenna, an external device such as a passive element needs to be placed near the antenna (e.g., Patent Literature 1).

Placing the external device may lead to an increase in antenna size.

CITATION LIST

Patent Literature

Patent Literature 1: Japanese Patent Application Laid-open No. 2016-139965

SUMMARY

An antenna according to an example of a plurality of embodiments of the present disclosure includes a radiation conductor, a ground conductor, a first feeding line, a second feeding line, and a connecting conductor. The first feeding line is electromagnetically connected to the radiation conductor and configured to excite the radiation conductor in a first direction. The second feeding line is electromagnetically connected to the radiation conductor and configured to excite the radiation conductor in a second direction. The connecting conductor is positioned apart from the center of the radiation conductor. The connecting conductor is spaced apart from the first feeding line by a first distance. The connecting conductor is spaced apart from the second feeding line by a second distance. The first distance is substantially equal to the second distance.

An array antenna according to an example of a plurality of embodiments of the present disclosure includes a plurality of antenna elements that are a plurality of the antennas described above. The antenna elements are arranged in the first direction.

A wireless communication module according to an example of a plurality of embodiments of the present disclosure includes the antenna element described above and a drive circuit. The drive circuit is configured to be directly or indirectly connected to each of the first feeding line and the second feeding line.

A wireless communication module according to an example of a plurality of embodiments of the present disclosure includes the array antenna described above and a drive circuit. The drive circuit is configured to be directly or indirectly connected to each of the first feeding line and the second feeding line.

A wireless communication device according to an example of a plurality of embodiments of the present disclosure includes the wireless communication module described above and a power source. The power source is configured to drive the drive circuit.

DESCRIPTION OF EMBODIMENTS

In conventional techniques, placing an external device may lead to an increase in antenna size.

The present disclosure relates to providing an antenna, an array antenna, a wireless communication module, and a wireless communication device that are novel.

Embodiments of the present disclosure will be described below.

Figure 1:
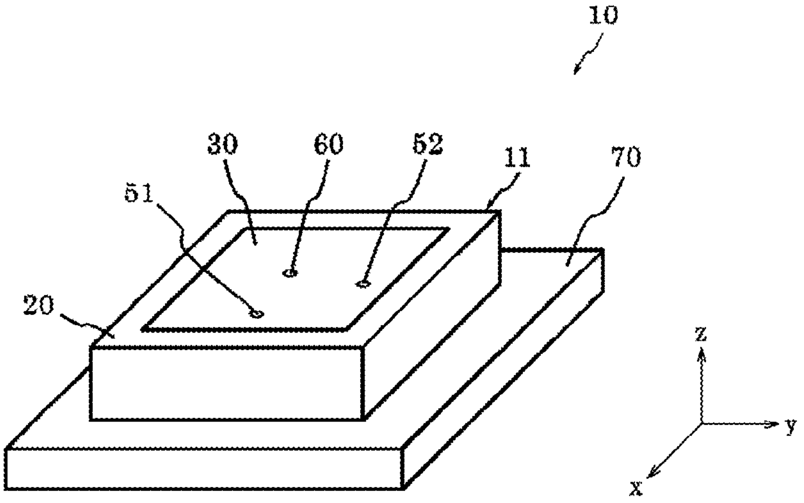
FIG. 1 is a perspective view illustrating an embodiment of an antenna.
Figure 2:
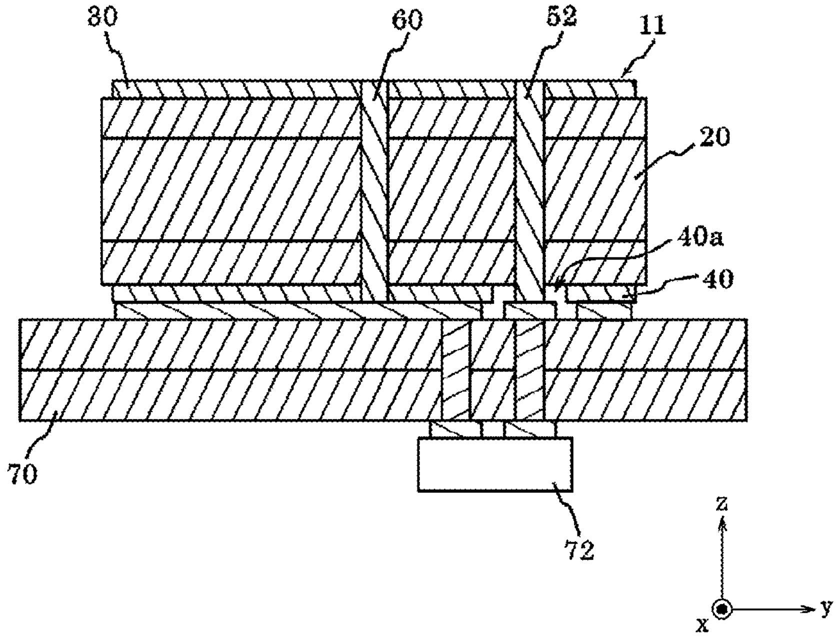
FIG. 2 is a cross-sectional view illustrating an embodiment of an antenna.

As illustrated in FIGS. 1 and 2, an antenna 10 includes a base 20, a radiation conductor 30, a ground conductor 40, a first feeding line 51, a second feeding line 52*a*, a connecting conductor 60, and a circuit board 70. The base 20 is in contact with the radiation conductor 30, the ground conductor 40, the first feeding line 51, the second feeding line 52, and the connecting conductor 60. The radiation conductor 30, the ground conductor 40, the first feeding line 51, the second feeding line 52, and the connecting conductor 60 are configured to function as an antenna element 11. The antenna 10 is configured to oscillate at a predetermined resonance frequency and radiate electromagnetic waves.

The base 20 may include any one of a ceramic material and a resin material as its composition. Examples of the ceramic material include, but are not limited to, sintered aluminum oxide, sintered aluminum nitride, sintered mullite, sintered glass ceramics, crystallized glass including a crystalline component deposited in a glass base material, sintered fine crystals such as mica or aluminum titanate, etc. Examples of the resin material include, but are not limited to, those obtained by curing uncured products such as epoxy resins, polyester resins, polyimide resins, polyamide-imide resins, polyetherimide resins, and liquid crystal polymers.

The radiation conductor 30 and the ground conductor 40 may include any of a metallic material, an alloy of a metallic material, a cured material of metal paste, and a conductive polymer as a composition. The radiation conductor 30 and the ground conductor 40 may be made of all the same materials. The radiation conductor 30 and the ground conductor 40 may be made of all the different materials. The radiation conductor 30 and the ground conductor 40 may include any combination of the same materials. Examples of the metal material include, but are not limited to, copper, silver, palladium, gold, platinum, aluminum, chromium, nickel, cadmium, lead, selenium, manganese, tin, vanadium, lithium, cobalt, titanium, etc. The alloy includes a plurality of metal materials. Examples of the metal paste include, but are not limited to, those obtained by mixing powder of a metal material with an organic solvent and a binder. Examples of the binder include, but are not limited to, epoxy resins, polyester resins, polyimide resins, polyamide-imide resins, polyetherimide resins, etc. Examples of the conductive polymer include, but are not limited to, polythiophene-based polymers, polyacethylene-based polymers, polyaniline-based polymers, polypyrrole-based polymers, etc.

The radiation conductor 30 is configured to function as a resonator. The radiation conductor 30 may be configured as a patch-type resonator. In an example, the radiation conductor 30 is positioned on the base 20. In an example, the radiation conductor 30 is positioned at an end of the base 20 in a z direction. In an example, the radiation conductor 30 may be positioned in the base 20. A part of the radiation conductor 30 may be positioned inside the base 20 and another part thereof may be positioned outside the base 20. The surface of a part of the radiation conductor 30 may face the outside of the base 20.

In an example of a plurality of embodiments, the radiation conductor 30 extends along a first plane. Ends of the radiation conductor 30 are along a first direction and a second direction. The first direction and the second direction intersect each other. The first direction may be orthogonal to the second direction. In the present disclosure, the first direction (first axis) is denoted as an x direction. In the present disclosure, the second direction (second axis) is denoted as a y direction. In the present disclosure, a third direction (third axis) is denoted as the z direction. In the present disclosure, the first plane is denoted as an xy plane. In the present disclosure, a second plane is denoted as a yz plane. In the present disclosure, a third plane is denoted as a zx plane. These planes are planes in a coordinate space, and are not intended to indicate a particular plate or a particular surface. In the present disclosure, a surface integral in the xy plane may be referred to as first surface integral. In the present disclosure, a surface integral in the yz plane may be referred to as second surface integral. In the present disclosure, a surface integral in the zx plane may be referred to as third surface integral. The surface integral is represented by a unit such as square meter. In the present disclosure, a length in the x direction may be simply referred to as "length". In the present disclosure, a length in the y direction may be simply referred to as "width". In the present disclosure, a length in the z direction may be simply referred to as "height".

In an example of a plurality of embodiments, the ground conductor 40 may be configured to function as the ground of the antenna element 11. In an example of a plurality of embodiments, the ground conductor 40 extends along the first plane. The ground conductor 40 faces the radiation conductor 30 in the z direction.

Each of the first feeding line 51 and the second feeding line 52 may be configured to supply an electrical signal from the outside to the antenna element 11. Each of the first feeding line 51 and the second feeding line 52 may be configured to supply an electrical signal from the antenna element 11 to the outside.

Each of the first feeding line 51 and the second feeding line 52 is electrically connected to the radiation conductor 30. Each of the first feeding line 51 and the second feeding line 52 only needs to be electromagnetically connected to the radiation conductor 30. In the present disclosure, "electromagnetic connection" includes electrical connection and magnetic connection. The first feeding line 51 and the second feeding line 52 are in contact with different positions of the radiation conductor 30. As illustrated in FIG. 2, the ground conductor 40 has a plurality of openings 40*a*. The first feeding line 51 and the second feeding line 52 individually pass through the openings 40*a* of the ground conductor 40.

The first feeding line 51 is configured to contribute at least to supply of an electrical signal when the radiation conductor 30 resonates in the x direction. The second feeding line 52 is configured to contribute at least to supply of an electrical signal when the radiation conductor 30 resonates in the y direction. The first feeding line 51 and the second feeding line 52 are configured to excite the radiation conductor 30 in different directions. With the first feeding line 51 and the second feeding line 52, the antenna 10 can reduce the excitation of the radiation conductor 30 in one direction during the excitation of the radiation conductor 30 in the other direction.

The connecting conductor 60 is configured to electrically connect the radiation conductor 30 and the ground conductor 40. A connection point between the radiation conductor 30 and the connecting conductor 60 serves as a potential reference of the radiation conductor 30 during resonance. The connecting conductor 60 extends along the z direction.

Figure 4:
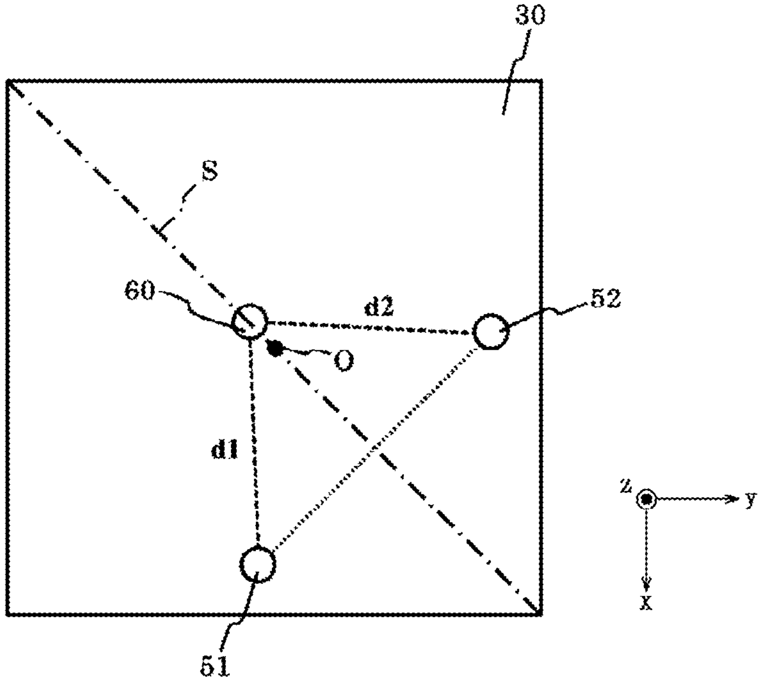
FIG. 4 is a plan view illustrating an embodiment of a radiation conductor.

As illustrated in FIG. 4, the connecting conductor 60 is positioned apart from a center O of the radiation conductor 30 in the xy plane. The connecting conductor 60 is connected to a point different from the center O of the radiation conductor 30 in planar view of the xy plane. If the connecting conductor 60 is positioned at the center O of the radiation conductor 30, a change in current distribution due to the connection of the connecting conductor 60 is extremely small. In contrast, connecting the connecting conductor 60 to the point different from the center O of the radiation conductor 30 changes the potential reference. The current distribution changes by the change in potential reference. When the current distribution changes, a radiation pattern changes. With the connecting conductor 60 connected to the point different from the center O of the radiation conductor 30, the antenna 10 can change the radiation pattern.

The connecting conductor 60 is spaced apart from the first feeding line 51 by a first distance d1. For example, the point where the connecting conductor 60 is connected to the radiation conductor 30 is spaced apart from a point where the first feeding line 51 is connected to the radiation conductor 30 by the first distance d1.

The connecting conductor 60 is spaced apart from the second feeding line 52 by a second distance d2. For example, the point where the connecting conductor 60 is connected to the radiation conductor 30 is spaced apart from a point where the second feeding line 52 is connected to the radiation conductor 30 by the second distance d2. The first distance d1 is substantially equal to the second distance d2.

The connecting conductor 60 may be spaced apart from the first feeding line 51 by a distance of ¼ of an effective wavelength 2, in the x direction. The connecting conductor 60 may be spaced apart from the second feeding line 52 by a distance of ¼ of the effective wavelength in the y direction.

The radiation conductor 30 may include a symmetry axis S that passes through the center O. The symmetry axis S passes through the center O and extends in a direction intersecting the x direction and the y direction. When the radiation conductor 30 is a square substantially parallel to the xy plane, the symmetry axis S may extend along a direction inclined at 45 degrees from a y-axis positive direction to an x-axis positive direction. The first feeding line 51 and the second feeding line 52 are symmetric with respect to the symmetry axis S. For example, the point where the first feeding line 51 is connected to the radiation conductor 30 and the point where the second feeding line 52 is connected to the radiation conductor 30 may be line-symmetric with respect to the symmetry axis S. The connecting conductor 60 is positioned on the symmetry axis S. With the connecting conductor 60 positioned on the symmetry axis S, a change in a resonance direction of the radiation conductor 30 can be reduced. An effective adjustment range by the connecting conductor 60 may be a range in which a resonant electromagnetic field of ½ of the effective wavelength can be maintained.

A direction connecting the first feeding line 51 and the connecting conductor 60 is inclined with respect to the x direction. Because the first feeding line 51 and the connecting conductor 60 are arranged to be inclined with respect to the x direction, the first feeding line 51 and the connecting conductor 60 can excite the radiation conductor 30 in the y direction as well. A direction connecting the second feeding line 52 and the connecting conductor 60 is inclined with respect to the y direction. Because the second feeding line 52 and the connecting conductor 60 are arranged to be inclined with respect to the y direction, the second feeding line 52 and the connecting conductor 60 can excite the radiation conductor 30 in the x direction as well. The excitation of the radiation conductor 30 in the two excitation directions causes impedance components in the respective directions to act on the feeding lines. The antenna 10 may decrease an impedance at the time of input by canceling impedance components in the respective directions. By decreasing the impedance at the time of input, the antenna 10 may enhance isolation between two polarization directions.

Figure 3:
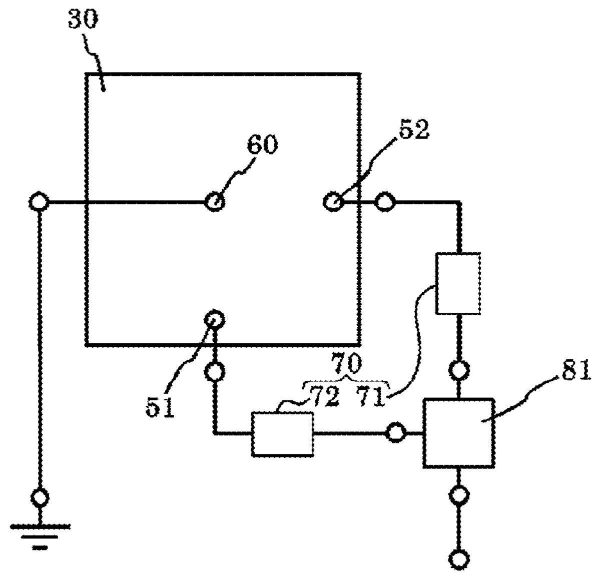
FIG. 3 is a block diagram illustrating an embodiment of an antenna.

As illustrated in FIG. 3, the circuit board 70 includes a first feeding circuit 71 and a second feeding circuit 72. The circuit board 70 may include any one of the first feeding circuit 71 and the second feeding circuit 72. The first feeding circuit 71 is configured to be electrically connected to the first feeding line 51. The second feeding circuit 72 is configured to be electrically connected to the second feeding line 52.

Figure 5:
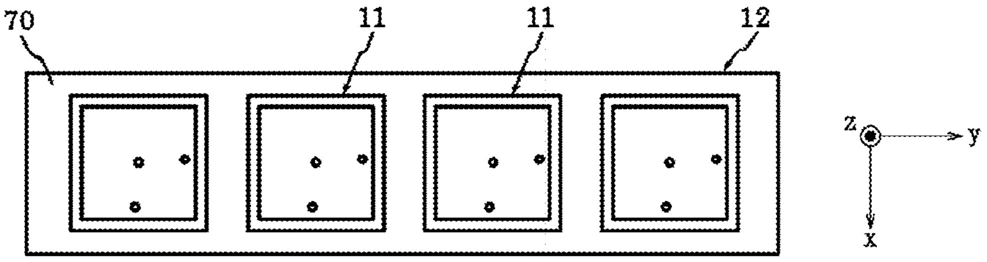
FIG. 5 is a plan view illustrating an embodiment of an array antenna.

As illustrated in FIG. 5, an array antenna 12 includes a plurality of antenna elements 11. The antenna elements 11 may be aligned along the x direction. The antenna elements 11 may be arranged in the x direction. The antenna elements 11 may be aligned along the y direction. The antenna elements 11 may be arranged in the y direction. The array antenna 12 includes at least one circuit board 70. The circuit board 70 includes at least one first feeding circuit 71 and at least one second feeding circuit 72. The array antenna 12 includes at least one first feeding circuit 71 and at least one second feeding circuit 72.

The first feeding circuit 71 may be connected to one or more antenna elements 11. The first feeding circuit 71 may be configured to supply the same signal to all the antenna elements 11 in feeding power to the antenna elements 11. The first feeding circuit 71 may be configured to supply the same signal to the first feeding lines 51 of the respective antenna elements 11 in feeding power to the antenna elements 11. The first feeding circuit 71 may be configured to supply signals of different phases to the first feeding lines 51 of the respective antenna elements 11 in feeding power to the antenna elements 11.

The second feeding circuit 72 may be connected to one or more antenna elements 11. The second feeding circuit 72 may be configured to supply the same signal to all the antenna elements 11 in feeding power to the antenna elements 11. The second feeding circuit 72 may be configured to supply the same signal to the second feeding lines 52 of the respective antenna elements 11 in feeding power to the antenna elements 11. The second feeding circuit 72 may be configured to supply signals of different phases to the second feeding lines 52 of the respective antenna elements 11 in feeding power to the antenna elements 11.

Figure 6:
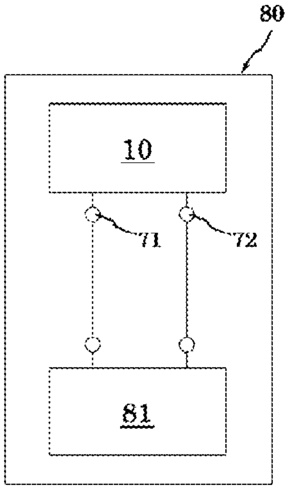
FIG. 6 is a plan view illustrating an embodiment of a wireless communication module.

As illustrated in FIG. 6, a wireless communication module 80 includes a drive circuit 81. The drive circuit 81 is configured to drive the antenna element 11. The drive circuit 81 may be configured to feed a transmission signal to at least one of the first feeding circuit 71 and the second feeding circuit 72. The drive circuit 81 may be configured to receive a reception signal fed from at least one of the first feeding circuit 71 and the second feeding circuit 72. The drive circuit 81 may be configured to be directly or indirectly connected to each of the first feeding line 51 and the second feeding line 52. The drive circuit 81 may be configured to feed a transmission signal to at least one of the first feeding line 51 and the second feeding line 52. The drive circuit 81 may be configured to receive a reception signal fed from at least one of the first feeding line 51 and the second feeding line 52. The drive circuit 81 may be configured to feed a transmission signal to the first feeding line 51 and receive a reception signal fed from the second feeding line 52.

Figure 7:
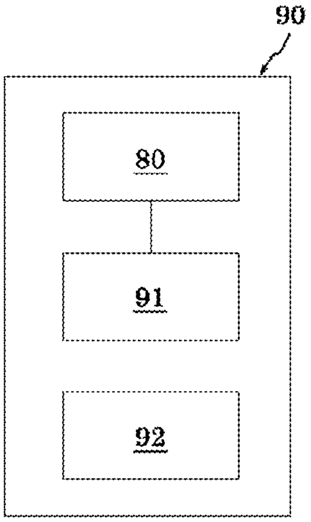
FIG. 7 is a plan view illustrating an embodiment of a wireless communication device.

As illustrated in FIG. 7, a wireless communication device 90 may include the wireless communication module 80, a sensor 91, and a battery 92.

The sensor 91 is configured to perform sensing. The battery 92 is configured to supply power to any part of the wireless communication device 90. When configured to supply power to the drive circuit 81 of the wireless communication module 80, the battery 92 may be a power source configured to drive the drive circuit 81.

Figure 8:
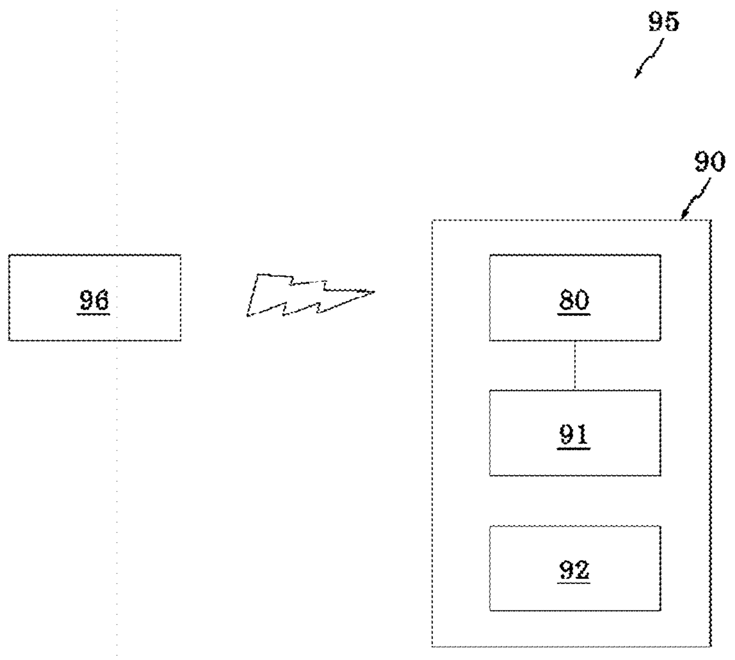
FIG. 8 is a plan view illustrating an embodiment of a wireless communication system.

As illustrated in FIG. 8, a wireless communication system 95 includes the wireless communication device 90 and a second wireless communication device 96. The second wireless communication device 96 is configured to perform wireless communication with the wireless communication device 90.

The configuration according to the present disclosure is not limited to some embodiments described above, and various modifications and changes can be made. For example, the functions included in the components may be rearranged without logical contradiction, and a plurality of components may be combined into one or may be divided.

The drawings that illustrate the configurations according to the present disclosure are schematic. The dimensional ratios and the like on the drawings do not necessarily match the actual ones.

In some embodiments described above, the patch antenna is employed as the antenna element 11. However, the antenna to be employed as the antenna element 11 is not limited to the patch antenna. Other antennas may be employed as the antenna element 11.

In the array antenna 12, the antenna elements 11 may be arranged in the same orientation. In the array antenna 12, two adjacent antenna elements 11 may be arranged in different orientations. When the two adjacent antenna elements 11 are arranged in different orientations, the antenna elements 11 are excited in the same direction.

In the present disclosure, the terms "first", "second", "third" and so on are examples of identifiers meant to distinguish the configurations from each other. In the present disclosure, regarding the configurations distinguished by the terms "first" and "second", the respective identifying numbers can be reciprocally replaced with each other. For example, regarding the first feeding line and the second feeding line, the identifiers "first" and "second" can be reciprocally exchanged. The exchange of identifiers is performed simultaneously. Even after exchanging the identifiers, the configurations remain distinguished from each other. Identifiers may be removed. The configurations from which the identifiers are removed are still distinguishable by the reference numerals. For example, the first feeding line 51 may be denoted as feeding line 51. In the present disclosure, the terms "first", "second" and so on of the identifiers should not be used in the interpretation of the order of the configurations, or should not be used as the basis for having identifiers with low numbers, or should not be used as the basis for having identifiers with high numbers. The present disclosure includes a configuration in which the circuit board 70 includes the second feeding circuit 72 but does not include the first feeding circuit 71.

The invention claimed is:

1. An antenna, comprising:

a radiation conductor;

a ground conductor;

a first feeding line electromagnetically connected to the radiation conductor and configured to excite the radiation conductor in a first direction;

a second feeding line electromagnetically connected to the radiation conductor and configured to excite the radiation conductor in a second direction; and a connecting conductor configured to electrically connect the radiation conductor to the ground conductor, the connecting conductor being positioned apart from a center of the radiation conductor, wherein a direction connecting the first feeding line and the connecting conductor is inclined with respect to the first direction, a direction connecting the second feeding line and the connecting conductor is inclined with respect to the second direction, the first feeding line is positioned apart from a first axis extending in the first direction through the center of the radiation conductor, and the second feeding line is positioned apart from a second axis extending in the second direction through the center of the radiation conductor.

2. The antenna according to claim 1, wherein the first feeding line and the second feeding line are symmetric with respect to a symmetry axis that passes through the center of the radiation conductor.

3. The antenna according to claim 2, wherein the connecting conductor is positioned on the symmetry axis.

4. The antenna according to claim 1, wherein the first direction is orthogonal to the second direction.

5. The antenna according to claim 1, wherein the first feeding line is positioned apart from the connecting conductor by a distance of 1/4 of an effective wavelength in the first direction.

6. The antenna according to claim 1, wherein the second feeding line is positioned apart from the connecting conductor by a distance of 1/4 of an effective wavelength in the second direction.

7. An array antenna comprising a plurality of antenna elements that are a plurality of the antennas according to claim 1, wherein the antenna elements are arranged in the first direction.

8. The array antenna according to claim 7, wherein the antenna elements are arranged in the first direction and the second direction.

9. A wireless communication module comprising:

the array antenna according to claim 7; and a drive circuit configured to be directly or indirectly connected to each of the first feeding line and the second feeding line.

10. The wireless communication module according to claim 9, wherein the drive circuit is configured to feed a transmission signal to at least one of the first feeding line and the second feeding line and receive a reception signal fed from at least one of the first feeding line and the second feeding line.

11. A wireless communication device comprising:

the wireless communication module according to claim 9; and a power source configured to drive the drive circuit.

12. A wireless communication module comprising:

the antenna according to claim 1; and a drive circuit configured to be directly or indirectly connected to each of the first feeding line and the second feeding line.

13. The wireless communication module according to claim 12, wherein the drive circuit is configured to feed a transmission signal to the first feeding line and receive a reception signal fed from the second feeding line.

14. A wireless communication device comprising:

the wireless communication module according to claim 12; and a power source configured to drive the drive circuit.

15. The antenna according to claim 1, wherein the connecting conductor is spaced apart from the first feeding line by a first distance and is spaced apart from the second feeding line by a second distance, the first distance being substantially equal to the second distance.

* * * * *